3,351,674
MIXED GLYCIDYL DERIVATIVES OF CYANURIC ACID AND PHENOLS

John E. Masters, Louisville, Ky., assignor to Celanese Coatings Company, a corporation of Delaware
No Drawing. Filed Aug. 2, 1965, Ser. No. 476,745
7 Claims. (Cl. 260—830)

This invention relates to a process for preparing composite epoxide resins. Particularly, this invention pertains to a process for preparing mixed glycidyl derivatives of cyanuric acid and phenols. The composite epoxide resins produced by the process of this invention can be further reacted with conventional epoxide resin curing agents to form cross-linked products which are useful as protective and decorative coatings, moldings, adhesives and the like.

In U.S. Patent 2,864,805 a process is described for preparing epoxide resins from a mixture of cyanuric acid and a polyhydric phenol by a two-stage process. The cyanuric acid and the polyhydric phenol are first reacted with epichlorohydrin in the presence of a catalyst to form polychlorohydrin derivatives which are then subjected to dehydrohalogenation to form epoxide resins.

In conducting the process of this invention, cyanuric acid is reacted in an excess of epichlorohydrin with an organic base as catalyst to form the trichlorohydrin derivative of cyanuric acid. A polyhydric phenol is then dissolved in the resulting solution and upon subsequent reaction with caustic, the trichlorohydrin derivative of cyanuric acid is dehydrohalogenated to form triglycidyl isocyanurate and the polyhydric phenol is condensed with epiclorohydrin to form the polyglycidyl ether of the polyhydric phenol. Compositions having excellent compatibility, high epoxide content and low chlorine content are so produced.

In U.S. Patent 2,864,805 the cyanuric acid and polyhydric phenol are both reacted in the first stage of the reaction.

In the process of this invention, only cyanuric acid is reacted with epichlorohydrin in the first stage. Interaction between cyanuric acid and its derivatives with the polyhydric phenol and its derivatives is eliminated during the catalytic reaction and side reactions are reduced, thereby leading to the production of purer products.

In the first step of this process, cyanuric acid is reacted with epichlorohydrin in an excess of epichlorohydrin using an organic base as catalyst to form the trichlorohydrin isocyanurate. Cyanuric acid is substantially insoluble in epichlorohydrin. However, when cyanuric acid and epichlorohydrin are heated with agitation in the presence of an organic basic catalyst, the cyanuric acid gradually dissolves in the epichlorohydrin and at the same time reacts with the epichlorohydrin to form soluble trichlorohydrin derivatives of cyanuric acid.

The epichlorohydrin used in the process of this invention serves as a reactant and as a solvent. Part of the epichlorohydrin reacts with the cyanuric acid under the organic base catalysis, part condenses with the polyhydric phenol in the subsequent caustic reaction and the remainder serves as a solvent for the reactants and reaction products. Cyanuric acid is trifunctional and will react with three mols of epichlorohydrin. However, when only three mols of epichlorohydrin per mol of cyanuric acid are used, considerable amounts of polymeric and complex products result due to the interaction of cyanuric acid with the epichlorohydrin-cyanuric acid reaction product. In order to obtain products which are largely monomeric, an excess of epichlorohydrin should be used. As the excess of epichlorohydrin is increased, the amount of polymeric product is decreased. In conducting the first stage of this reaction, it is preferred to use at least about six mols of epichlorohydrin for each mol of cyanuric acid or, as expressed in equivalents, at least about two mols of epichlorohydrin per active hydrogen equivalent of the cyanuric acid. Higher ratios of epichlorohydrin can be used in order to obtain more monomeric products and to have a reaction medium of handable viscosity. However, since the unreacted epichlorohydrin should be recovered for economic reasons, it is preferred to use from about six to about fifteen mols of epichlorohydrin for each mol of cyanuric acid.

The catalysts used in the reaction of cyanuric acid and epichlorohydrin are organic basic catalysts which include tertiary amines, such as triethylamine, tripropylamine, tributylamine, dimethylaniline, benzyl dimethylamine, etc., and quaternary ammonium compounds, such as benzyl trimethyl ammonium hydroxide, benzyl trimethyl ammonium chloride, benzyl trimethyl ammonium methoxide, trimethyl ammonium bromide as well as quaternary ammonium ion-exchange resins and the like. These catalysts are utilized in catalytic quantities, which can vary from about 0.05 to about 5 weight percent based on the weight of cyanuric acid.

As has been stated hereinbefore, cyanuric acid is substantially insoluble in epichlorohydrin, but when the two components are heated with a catalyst, the cyanuric acid gradually reacts with the epichlorohydrin and dissolves in the epichlorohydrin forming a solution of the trichlorohydrin derivative of cyanuric acid in epichlorohydrin. The extent of reaction can be followed by the dissolution of cyanuric acid. When the cyanuric acid is all dissolved, the formation of the trichlorohydrin derivative is substantially complete.

The reaction of cyanuric acid and epichlorohydrin is conducted at elevated temperatures in the range of about 60° C. to about 120° C. for a time sufficient to complete the reaction, generally about 30 minutes to about 3 hours.

After the reaction of cyanuric acid and epichlorohydrin is completed, a polyhydric phenol is added to and dissolved in the solution of trichlorohydrin derivative of cyanuric acid and epichlorohydrin followed by reaction with caustic to dehydrohalogenate the cyanuric acid derivative and to condense with dehydrohalogenation epichlorohydrin and the polyhydric phenol forming mixed glycidyl derivatives of cyanuric acid and the polyhydric phenol.

A wide variety of polyhydric phenols can be utilized in this invention, such phenols having more than one phenolic hydroxyl group and containing no other groups reactive with epoxide groups under the conditions of this process. Examples of polyhydric phenols are p,p'-dihydroxydiphenyl propane (Bisphenol A), p,p'-dihydroxydiphenyl, dihydroxydiphenyl sulfone, dihydroxybenzophenone, dihydroxydiphenyl methane, dihydroxydiphenyl ethane, resorcinol, hydroquinone, dihydroxynaphthalene, phloroglucinol, and novolak resins which are polyhydric phenols derived from substituted and unsubstituted phenols and aldehydes. These phenols can be monomeric or polymeric, mononuclear or polynuclear and can contain substituents, such as halogens and alkyl groups, in the aromatic rings.

The amount of polyhydric phenol that is added to the solution of trichlorohydrin derivative of cyanuric acid and epichlorohydrin can be varied quite widely. This amount of polyhydric phenol can be expressed as the weight ratio of polyhydric phenol to cyanuric acid originally present. Generally, this ratio is about 5 to about 95 parts of polyhydric phenol to 95 to 5 parts, the total being 100, of cyanuric acid, with the preferred ratios being about 25 to about 75 parts of polyhydric phenol to 75 to 25 parts of cyanuric acid.

As has been stated hereinbefore, at least about two mols of epichlorohydrin per active hydrogen of the cyanuric acid are required in the initial reaction. In carrying out the second step of this process, at least an additional 2 mols of epichlorohydrin are needed for each phenolic hydroxyl group of the polyhydric phenol and preferably from about 2 to about 5 mols of epichlorohydrin for each phenolic hydroxyl. All of this epichlorohydrin can be present during the initial reaction or it can be added subsequent to the initial reaction. The total amount of epichlorohydrin used can be expressed as about 2 to about 5 mols for each active hydrogen equivalent present in the reaction including the active hydrogens of the cyanuric acid and the active hydrogens of the phenolic compound.

When low quantities of epichlorohydrin are used, some interaction of the polyhydric phenol and the trichlorohydrin derivative of cyanuric acid takes place producing composite products which are somewhat polymeric in nature. When larger amounts of epichlorohydrin are utilized, the composite products are largely monomeric.

The second stage, or dehydrohalogenation step, of this process is conducted with an alkali metal hydroxide, preferably sodium or potassium hydroxide. The amount of hydroxide added is substantially equivalent to the active hydrogen of the cyanuric acid originally present and to the active hydrogens of the added polyhydric phenol. The alkali metal hydroxide is added incrementally as solid flakes or pellets, or as a dispersion in inert solvent, such as aromatic hydrocarbons and ketones, the rate of addition being governed by the heat generated in the reaction. The dehydrohalogenation reaction is carried out at a temperature below 120° C. and preferably in the range of about 40° C. to about 100° C.

After the dehydrohalogenation reaction is completed, the composite epoxide containing product is recovered by removing the salt formed in the reaction by filtration, extraction or centrifugation and by distilling off the unreacted epichlorohydrin.

The invention is further illustrated by the following examples, but it is to be understood that the invention is not limited thereto. In the examples, the parts are by weight.

*Example 1*

To a suitable reaction flask equipped with a stirrer, condenser and thermometer were added 74 parts of cyanuric acid, 1260 parts of epichlorohydrin and 2 parts of a 60 percent aqueous benzyltrimethyl ammonium chloride solution. Heat and stirring were applied raising the temperature of the reactants to 115° C. The temperature was held at 115° C. to 120° C. for one hour. During this heating period, the cyanuric acid completely dissolved in the epichlorohydrin. The resulting solution was cooled to 42° C. and 114 parts of p,p'-dihydroxydiphenyl propane were dissolved in the solution. 38 parts of flake sodium hydroxide were added to the solution and the temperature was raised to 70° C. over a period of seven minutes. The heat source was removed and the temperature dropped to 46° C. over a period of twenty-eight minutes. 36 parts of flake sodium hyroxide were added and the temperature was raised to 70° C. over a period of ten minutes. The solution was again cooled to 46° C. and 36 parts of flake sodium hydroxide were added to the reactants. The temperature was then raised to 125° C. over a period of forty-five minutes while distilling off the water formed in the reaction along with epichlorohydrin. After cooling to room temperature, the salts were removed by filtration and the excess epichlorohydrin was distilled from the reaction product by heating to a flask temperature of 150° C. under 25–30 mm. Hg pressure. 331 parts of product were obtained having an epoxide equivalent weight of 205 and a chlorine content of 2.8 percent.

*Example 2*

Using the same procedure as was described in Example 1, 1280 parts of epichlorohydrin, 65 parts of cyanuric acid and 2 parts of a 60 percent aqueous solution of benzyl trimethyl ammonium chloride were reacted followed by reaction with 134 parts of p,p'-dihydroxydiphenyl propane and 115 parts of flake sodium hydroxide. 352 parts of product were obtained having an epoxide equivalent weight of 202 and a chlorine content of 2.5 percent.

*Example 3*

To a suitable reaction flask equipped with a stirrer, thermometer, condenser and dropping funnel were added 43 parts of cyanuric acid, 720 parts of epichlorohydrin and 3 parts of a 60 percent aqueous solution of benzyl trimethyl ammonium chloride. Heat was applied raising the temperature to 115° C. After twenty-seven minutes, the temperature was 118° C. and all the cyanuric acid had dissolved. The solution was cooled to 40° C. and 76 parts of p,p'-dihydroxydiphenyl propane were added and dissolved in the solution. A caustic dispersion (68 parts sodium hydroxide, 102 parts xylene, and 0.68 part dimerized fatty acids) was added to the dropping funnel. The caustic dispersion was slowly added to the reactants over a two hour period while the temperature rose from 40° C. to 55° C. The temperature was then raised to 123° C. while removing the water formed in the reaction along with epichlorohydrin. After cooling, the salts were removed by filtration and the epichlorohydrin was removed by distillation to a flask temperature of 110° C. under a pressure of 5–10 mm. Hg 226 parts of product were recovered having an epoxide equivalent weight of 217.

The epoxide resins produced by the process of this invention are useful as coatings, moldings, encapsulations, laminates and the like. They are cured with the known epoxide resin curing agents, such as polyfunctional amines, polycarboxylic acids, polycarboxylic acid anhydrides, and boron trifluoride complexes.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing composite epoxide resins which comprises reacting cyanuric acid in an excess of epichlorohydrin using an organic base as catalyst to form polychlorohydrin derivatives of cyanuric acid, adding to and dissolving therein a polyhydric phenol and reacting the resulting solution with an alkali metal hydroxide, said components being in a ratio of at least about 2 mols of epichlorohydrin for each active hydrogen equivalent of the cyanuric acid and for each active hydrogen equivalent of the polyhydric phenol and wherein the amount of alkali metal hydroxide used is substantially equivalent to the total active hydrogens of the cyanuric acid and of the polyhydric phenol to form a composite epoxide resin of polyglycidyl isocyanurate and polyglycidyl ethers of the polyhydric phenol.

2. The process of claim 1 wherein the weight ratio of cyanuric acid originally present to added polyhydric phenol is 5 to 95 parts of cyanuric acid to 95 to 5 parts of polyhydric phenol, the total parts being 100.

3. The process of claim 1 wherein the alkali metal hydroxide is sodium hydroxide and the polyhydric phenol is p,p'-dihydroxydiphenyl propane.

4. The process of claim 1 wherein the polyhydric phenol is resorcinol.

5. The process of claim 1 wherein about 2 to about 5 mols of epichlorohydrin are present for each active hydrogen equivalent of the cyanuric acid and for each active hydrogen equivalent of the polyhydric phenol.

6. The process of claim 5 wherein all the epichlorohydrin is present during the cyanuric acid-epichlorohydrin reaction.

7. The process of claim 5 wherein 2 to 5 mols of epichlorohydrin for each active hydrogen of the cyanuric acid are present during the cyanuric acid-epichlorohydrin reaction and 2 to 5 mols of epichlorohydrin per active hydrogen equivalent of the polyhydric phenol are added with the polyhydric phenol.

References Cited

UNITED STATES PATENTS

| 2,864,805 | 12/1958 | Cooke | 260—47 |
| 2,893,978 | 7/1959 | Cooke | 260—47 |

WILLIAM H. SHORT, *Primary Examiner.*

T. D. KERWIN, *Assistant Examiner.*